Patented Aug. 7, 1945

2,381,124

UNITED STATES PATENT OFFICE 2,381,124

COMPOSITION FOR CLEANING METAL SUCH AS ALUMINUM AND MAGNESIUM

Joseph F. Hart, Los Angeles, Calif., assignor to Kelite Products, Inc., Los Angeles, Calif., a corporation of California No Drawing. Application October 23, 1940, Serial No. 362,410

7 Claims. (Cl. 252—138)

This invention relates to a composition for cleaning metals, such as aluminum and magnesium, and refers particularly to a composition suitable for preparing aluminum for an anodizing treatment, or for preparing magnesium preliminary to a chromidizing treatment, or for removing coatings from such materials.

In order to protect aluminum from the outside elements, it is commonly subjected to an anodizing treatment for the purpose of building up the coating of aluminum oxide. Preliminary to such an anodizing treatment, the aluminum should be thoroughly cleaned. Previous to the present invention, difficulty was experienced in rapidly cleaning aluminum. Most cleansing agents depend upon the action of an alkali, and aluminum may be attacked rapidly by an alkali, resulting in etching.

Similar difficulties are experienced in preparing magnesium for a chromidizing operation.

It is also a practice to coat aluminum with different coating materials for the purpose of preserving the aluminum. For example, primer coating may be applied, such as a zinc chromate primer. Where it has been found desirable to remove such primer coating, the art previous to the present invention experienced great difficulties.

It is a general object of the present invention to provide a composition for cleaning aluminum or magnesium which is more effective than the compositions previously employed and which may be employed without danger of attack on the metal.

The present invention involves the discovery that alkali silicates when properly combined with acid phosphates may produce a composition which, when dissolved in water, possesses a high cleaning efficiency for metal such as aluminum or magnesium, while at the same time the aqueous solution of such composition is unreactive to the metals so that etching will not result. Alkali silicates have been previously employed in cleansing compounds but as previously employed have always possessed a pronounced tendency to attack or etch metals such as aluminum or magnesium. Likewise, acid phosphates exhibit a tendency to attack or etch aluminum. It has been discovered, however, that by properly combining such substances the tendency of the materials for attacking the metals is eliminated without interfering with their cleansing properties.

The proper proportions for combining the alkali silicates with the acid phosphates is in such stoichiometric proportions as to theoretically be capable of converting all of the alkali silicates present and all of the acid phosphates present into the tri-phosphate and into the acid metasilicate salt. For example, sodium metasilicate, $Na_2O.SiO_2.5H_2O$, may be combined with disodium phosphate in the stoichiometric proportions of one mol of $Na_2HPO_4$ to 1 mol of $Na_2O.SiO_2.5H_2O$, and when so combined the following reaction may theoretically take place:

$Na_2HPO_4 + Na_2O.SiO_2.5H_2O =$
$NaHSiO_3 + Na_3PO_4 + 5H_2O$

A substantially equivalent composition for the purposes of the present invention may be produced from combining monosodium phosphate, $NaH_2PO_4$, with sodium orthosilicate, $Na_4SiO_4$, in which case the stoichiometric proportions required are three mols of $NaH_2PO_4$ with two mols of $NaHSiO_4$, and the following reaction is theoretically possible:

$3NaH_2PO_4 + 2Na_4SiO_4 =$
$2NaHSiO_3 + 3Na_3PO_4 + 2H_2O$

Similarly, a substantially equivalent composition for the purposes of the present invention may be made by combining disodium phosphate, $Na_2HPO_4$, with sodium orthosilicate, $Na_4SiO_4$, in which case the correct stoichiometric proportion to be employed is 3 mols of $Na_2HPO_4$ for each mol of $Na_4SiO_4$, and the following reaction may theoretically take place:

$3Na_2HPO_4 + Na_4SiO_4 = NaHSiO_3 + 3Na_3PO_4 + H_2O$

The proportions of ingredients are critical to the production of a composition which will not etch aluminum. The critical proportions are that the alkali silicates and the acid phosphates present must be such as to correspond to the compounds $NaHSiO_3$ and $Na_3PO_4$; or, stating the relationship on the basis of the anhydrides, for each mol of $P_2O_5$ there must be 3 mols of $Na_2O$, and for each 2 mols of $SiO_2$ present there must be 1 mol of $Na_2O$ present. If the ingredients are not present in substantially these critical relationships, the solution will in effect etch aluminum.

From the foregoing equations, it will be seen that various alkali silicates may be combined with various acid phosphates, each to produce solutions the composition of which can be represented as composed exclusively of trisodium phosphate and acid sodium metasilicate. Salts of other alkalis than sodium may be substituted, such as potassium salts if desired, although such salts are not believed to have any advantage over the employment of sodium salts and are merely more expensive.

In order that the composition should possess the cleansing properties desired while having substantially no etching effect on aluminum and magnesium, the stoichiometric proportions above indicated should be fairly closely followed, although some variation therefrom may be tolerated in practice. As an example of the permissible variation, the stoichiometric proportions when employing sodium metasilicate, $$Na_2SiO_3.5H_2O$$

and anhydrous disodium phosphate, $Na_2HPO_4$, I calculate to be 60 parts of the metasilicate to 40 parts of the disodium phosphate. Compositions in which the proportion of the disodium phosphate differ from the recommended value of 40 parts in either direction to the extent of about 3 parts from the figure of 40 may be employed, while with a greater temperature I have detected a noticeable etching.

For the purpose of cleaning aluminum preparatory to an anodizing operation or magnesium preparatory to a chromidizing treatment, it is sufficient to employ merely an aqueous solution of the composition. For example, 2 to 8 ounces of the composition per gallon of water may be employed. The cleaning operation is preferably effected by dipping the aluminum to be cleaned into the aqueous solution of the composition, which is preferably maintained at a temperature of, for example, 180 to 212° F., a suitable cleaning may be effected in from 30 seconds to 5 minutes. In certain cases, it may be desirable to add to the solution or cleansing composition a surface active agent or a surface tension reducing material for the purpose of facilitating a wetting of the aluminum by the cleansing solution. Various surface active agents may be employed, such for example as surface active agent of the alkyl aryl sulphonate type.

Where the composition is to be employed for removing coating materials, such as the zinc chromate primer from aluminum, it should contain additional ingredients. In such a case, I add to the aqueous solution a material, such for example as starch, for the purpose of making the cleaning composition into a thin paste. In such case, also, it may be desirable to add a solvent for any gums, etc., which may be on the metals to be treated, and I find solvents of the butyl "Cellosolve" (ethylene glycol monobutyl ether) type to be a suitable solvent for such purpose. It is also desirable in such cases to employ in the composition a pigment in order that the presence of the composition on the metal to be cleaned may be more readily detected. For example, for the purpose of removing coatings from aluminum, I have found the following particular compositions to be highly effective:

| | Percent |
|---|---|
| Sodium metasilicate ($Na_2O.SiO_2.5H_2O$) | 9 |
| Anhydrous disodium phosphate ($Na_2HPO_4$) | 6 |
| Starch | 3 |
| Surface active agent | 1 |
| Pigment (Turkey red umber) | 5 |
| Solvent | 6 | and the balance of 70% $H_2O$.

The above-indicated composition may be applied for removing coatings simply by spraying the composition on the aluminum from which the coating is to be removed. In contrast to the use of ordinary paint removers, which in order to effectively clean the metal must be wiped off and removed with rags, the coating composition of the present invention after being sprayed upon the metal to be cleaned may within a short period of time thereafter be removed merely by washing the same off with water. Where zinc chromate primer is to be removed from aluminum, it will be found that the primer coat will be peeled cleanly from the aluminum when the coating composition of the present invention is removed from the metal by washing the same off with water.

The composition of the present invention has the unusual property of affording an alkali cleaning agent for aluminum or magnesium which may be brought into prolonged contact therewith, even at elevated temperature if desired, without danger of the composition attacking or etching the metal.

I claim:

1. A composition for cleaning such metals as aluminum or magnesium, which composition comprises an aqueous solution containing sodium salts of orthophosphoric acid and silicic acid in substantially the stoichiometric proportions of three mols of $Na_2O$ per mol of $P_2O_5$ and one mol of $Na_2O$ per two mols of $SiO_2$.

2. A composition for cleaning such metals as aluminum or magnesium, which composition comprises an aqueous solution containing sodium salts of orthophosphoric acid and silicic acid in substantially the stoichiometric proportions of three mols of $Na_2O$ per mol of $P_2O_5$ and one mol of $Na_2O$ per two mols of $SiO_2$, the composition including a wetting agent.

3. A composition for cleaning such metals as aluminum or magnesium, which composition comprises an aqueous solution containing sodium salts of orthophosphoric acid and silicic acid in substantially the stoichiometric proportions of three mols of $Na_2O$ per mol of $P_2O_5$ and one mol of $Na_2O$ per two mols of $SiO_2$, the composition including starch and a wetting agent.

4. A composition for cleaning such metals as aluminum or magnesium, which composition comprises an aqueous solution containing sodium salts of orthophosphoric acid and silicic acid in substantially the stoichiometric proportions of three mols of $Na_2O$ per mol of $P_2O_5$ and one mol of $Na_2O$ per two mols of $SiO_2$, the composition including a solvent for gums, starch, and a wetting agent.

5. A composition for cleaning aluminum and magnesium, which comprises an aqueous solution including a sodium salt of orthophosphoric acid and silicic acid in substantially the stoichiometric proportions of four mols of $Na_2O$ and two mols of $SiO_2$ with each mol of $P_2O_5$.

6. A composition for cleaning aluminum and magnesium, which comprises an aqueous solution including a sodium salt of orthophosphoric acid and silicic acid in substantially the stoichiometric proportions of four mols of $Na_2O$ and two mols of $SiO_2$ with each mol of $P_2O_5$, the composition further including a wetting agent.

7. A composition for cleaning aluminum and magnesium, which comprises an aqueous solution including a sodium salt of orthophosphoric acid and silicic acid in substantially the stoichiometric proportions of four mols of $Na_2O$ and two mols of $SiO_2$ with each mol of $P_2O_5$, the composition including starch and a wetting agent.

JOSEPH F. HART.